US012679971B2

(12) United States Patent
Sirotiak et al.

(10) Patent No.: US 12,679,971 B2
(45) Date of Patent: Jul. 14, 2026

(54) AEROGEL HYBRID CONTAINING RESIN MIXTURE, PROCESS FOR ITS PRODUCTION AND USE

(71) Applicant: NDSU Research Foundation, Fargo, ND (US)

(72) Inventors: Todd Sirotiak, Ames, IA (US); Dean C. Webster, Fargo, ND (US); Samantha Silbert Uzelac, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 1470 days.

(21) Appl. No.: 17/313,653

(22) Filed: May 6, 2021

(65) Prior Publication Data

US 2021/0347990 A1      Nov. 11, 2021

Related U.S. Application Data

(60) Provisional application No. 63/020,647, filed on May 6, 2020.

(51) Int. Cl.
| | |
|---|---|
| C08L 75/14 | (2006.01) |
| C03C 17/00 | (2006.01) |
| C03C 17/32 | (2006.01) |
| C08J 3/11 | (2006.01) |
| C08J 9/35 | (2006.01) |
| C09D 175/14 | (2006.01) |

(52) U.S. Cl.
CPC ............ C08L 75/14 (2013.01); C03C 17/007 (2013.01); C03C 17/322 (2013.01); C08J 3/11 (2013.01); C08J 9/35 (2013.01); C09D 175/14 (2013.01); C08J 2375/14 (2013.01); C08J 2433/08 (2013.01); C08L 2205/02 (2013.01)

(58) Field of Classification Search
CPC ... C03C 17/007; C03C 17/009; C03C 17/322; C03C 2217/445; C03C 2217/478; C03C 2217/48; C08G 2110/0091; C09D 175/14; C09D 175/16; C08L 75/14; C08L 75/161
See application file for complete search history.

(56) References Cited

U.S. PATENT DOCUMENTS

2012/0142815 A1*   6/2012  Mirante ............... C09D 175/14
                                                          523/218

FOREIGN PATENT DOCUMENTS

CN          107427450 A   * 12/2017   ............... A61Q 1/12

OTHER PUBLICATIONS

CN107427450 English Translation, 2025 (Year: 2025).*
Buratti, "Glazing systems with silica aerogel for energy savings in buildings", Applied Energy, 98, 369-403, Apr. 27, 2012. (Year: 2012).*
Abdul, Mujeebu, Muhammad, Noman Ashraf, and Abdulkarim Alsuwayigh. 2016. "Energy Performance and Economic Viability of Nano Aerogel Glazing and Nano Vacuum Insulation Panel in Multi-Story Office Building." Energy 113: 949-56. https://doi.org/10.1016/j.energy.2016.07.136.
Arici, Muslum, Hasan Karabay, and Miraç Kan. 2015. "Flow and Heat Transfer in Double, Triple and Quadruple Pane Windows." Energy and Buildings 86: 394-402. https://doi.org/10.1016/j.enbuild.2014.10.043.
Berardi, Umberto 2015b. "The Development of a Monolithic Aerogel Glazed Window for an Energy Retrofitting Project." Applied Energy 154: 603-15. https://doi.org/10.1016/j.apenergy.2015.05.059.
Berardi, Umberto. 2015a. "Development of Glazing Systems with Silica Aerogel." In Energy Procedia 78: 394-99. https://doi.org/10.1016/j.egypro.2015.11.682.
Berthou, Yannick, Pascal Henry Biwole, Patrick Achard, Hébert Sallée, Mireille Tantot-Neirac, and Frédéric Jay. 2015. "Full Scale Experimentation on a New Translucent Passive Solar Wall Combining Silica Aerogels and Phase Change Materials." Solar Energy 115: 733-42. https://doi.org/10.1016/j.solener.2015.03.038.
Błaszczyński, Tomasz, Agnieszka Ślosarczyk, and Maciej Morawski. 2013. "Synthesis of Silica Aerogel by Supercritical Drying Method." Procedia Engineering 57: 200-06. https://doi.org/10.1016/j.proeng.2013.04.028.
Buratti, C., and E. Moretti. 2012a. "Experimental Performance Evaluation of Aerogel Glazing Systems." Applied Energy 97: 430-37. https://doi.org/10.1016/j.apenergy.2011.12.055.
Buratti, C., and E. Moretti. 2012b. "Glazing Systems with Silica Aerogel for Energy Savings in Buildings." Applied Energy 98: 396-403. https://doi.org/10.1016/j.apenergy.2012.03.062.
Cotana, Franco, Anna Laura Pisello, Elisa Moretti, and Cinzia Buratti. 2014. "Multipurpose Characterization of Glazing Systems with Silica Aerogel: In-Field Experimental Analysis of Thermal-Energy, Lighting and Acoustic Performance." Building and Environment 81: 92-102. https://doi.org/10.1016/j.buildenv.2014.06.014.
Cuce, Erdem, and Saffa B. Riffat. 2015. "Aerogel-Assisted Support Pillars for Thermal Performance Enhancement of Vacuum Glazing: A CFD Research for a Commercial Product." Arabian Journal for Science and Engineering 40 (8): 2233-38. https://doi.org/10.1007/s13369-015-1727-5.
Cuce, Erdem, Pinar Mert Cuce, Christopher J. Wood, and Saffa B. Riffat. 2014a. "Optimizing Insulation Thickness and Analysing Environmental Impacts of Aerogel-Based Thermal Superinsulation in Buildings." Energy and Buildings 77: 28-39. https://doi.org/10.1016/j.enbuild.2014.03.034.

(Continued)

*Primary Examiner* — Christopher M Rodd
(74) *Attorney, Agent, or Firm* — Goodhue, Coleman & Owens, P.C.

(57) ABSTRACT

An aerogel hybrid and a method for preparing the aerogel hybrid. The aerogel hybrid includes a resin composition and a plurality of aerogel particles. The resin composition may fill the interstitial space between the plurality of aerogel particles. The aerogel hybrid may be produced by preparing the aerogel and preparing the resin composition, blending the aerogel and the resin composition together to form an aerogel hybrid and curing the aerogel hybrid for providing an aerogel hybrid containing resin mixture with the ability to fit large amounts of aerogel into the resin to enhance the aerogel's physical properties.

13 Claims, 8 Drawing Sheets

(56) References Cited

OTHER PUBLICATIONS

Cuce, Erdem, Pinar Mert Cuce, Christopher J. Wood, and Saffa B. Riffat. 2014b. "Toward Aerogel Based Thermal Superinsulation in Buildings: A Comprehensive Review." Renewable and Sustainable Energy Reviews. https://doi.org/10.1016/j.rser.2014.03.017.

Dowson, Mark, Adam Poole, David Harrison, and Gideon Susman. 2012. "Domestic UK Retrofit Challenge: Barriers, Incentives and Current Performance Leading into the Green Deal." Energy Policy 50: 294-305. https://doi.org/10.1016/i.enpol.2012.07.019.

Dowson, Mark, David Harrison, Salmaan Craig, and Zachary Gill. 2011. "Improving the Thermal Performance of Single-Glazed Windows Using Translucent Granular Aerogel." International Journal of Sustainable Engineering 4 (3): 266-80. https://doi.org/10.1080/19397038.2011.558931.

Duer, K., and S. Svendsen. 1998. "Monolithic Silica Aerogel in Superinsulating Glazings." Solar Energy 63 (4): 259-67. https://doi.org/10.1016/S0038-092X(98)00063-2.

Fricke, J., R. Caps, D. Buttner, U. Heinemann, and E. Hümmer. 1987. "Silica Aerogel—A Light-Transmitting Thermal Superinsulator." Journal of Non-Crystalline Solids 95-96 (December): 1167-74. https://doi.org/10.1016/S0022-3093(87)80730-5.

Gao, Tao, Bjørn Petter Jelle, and Arild Gustavsen. 2016. "Building Integration of Aerogel Glazings." Procedia Engineering 145 (1877): 723-28. https://doi.org/10.1016/j.proeng.2016.04.090.

Gao, Tao, Bjørn Petter Jelle, Takeshi Ihara, and Arild Gustavsen. 2014. "Insulating Glazing Units with Silica Aerogel Granules: The Impact of Particle Size." Applied Energy 128:27-34. https://doi.org/10.1016/j.apenergy.2014.04.037.

Gao, Tao, Takeshi Ihara, Steinar Grynning, Bjørn Petter Jelle, and Anne Gunnarshaug Lien. 2016. "Perspective of Aerogel Glazings in Energy Efficient Buildings." Building and Environment 95: 405-13. https://doi.org/10.1016/j.buildenv.2015.10.001.

Garnier, C., T. Muneer, and L. McCauley. 2015. "Super Insulated Aerogel Windows: Impact on Daylighting and Thermal Performance." Building and Environment 94 (P1): 231-38. https://doi.org/10.1016/j.buildenv.2015.08.009.

Gurav, Jyoti L., In-Keun Jung, Hyung-Ho Park, Eul Son Kang, and Digambar Y. Nadargi. 2010. "Silica Aerogel: Synthesis and Applications." Journal of Nanomaterials 2010: 1-11. https://doi.org/10.1155/2010/409310.

Hostler, S. R., A. R. Abramson, M. D. Gawryla, S. A. Bandi, and D. A. Schiraldi. 2009. "Thermal Conductivity of a Clay-Based Aerogel." International Journal of Heat and Mass Transfer 52 (3-4): 665-69. https://doi.org/10.1016/j.jheatmasstransfer.2008.07.002.

Hrubesh, Lawrence W. 1998. "Aerogel Applications." Journal of Non-Crystalline Solids 225:335-42. https://doi.org/10.1016/S0022-3093(98)00135-5.

Ibrahim, Mohamad, Pascal Henry Biwole, Patrick Achard, Etienne Wurtz, and Guillaume Ansart. 2015. "Building Envelope with a New Aerogel-Based Insulating Rendering: Experimental and Numerical Study, Cost Analysis, and Thickness Optimization." Applied Energy 159: 490-501. https://doi.org/10.1016/j.apenergy.2015.08.090.

Ihara, Takeshi, Tao Gao, Steinar Grynning, Bjørn Petter Jelle, and Arild Gustavsen. 2015. "Aerogel Granulate Glazing Facades and Their Application Potential from an Energy Saving Perspective." Applied Energy 142: 179-91. https://doi.org/10.1016/j.apenergy.2014.12.053.

In, E., and H. Naguib. 2015. "Fabrication and Characterization of Silica Aerogel as Synthetic Tissues for Medical Imaging Phantoms." AIP Conference Proceedings 1664: 130002-1-130002-5. https://doi.org/10.1063/1.4918495.

Jelle, Bjørn Petter, Ruben Baetens, and Arild Gustavsen. 2011. "Aerogel Insulation for Building Applications: A state-of-the-art review." Energy and Builing 43: 761-769.

Jensen, J. M. Schultz, and F. H. Kristiansen. 2004. "Development of Windows Based on Highly Insulating Aerogel Glazings." Journal of Non-Crystalline Solids 350: 351-57. https://doi.org/10.1016/j.jnoncrysol.2004.06.047.

Jensen, Karsten I. 1992. "Passive Solar Component Based on Evacuated Monolithic Silica Aerogel." Journal of Non-Crystalline Solids 145 (C): 237-39. https://doi.org/10.1016/S0022-3093(05)80463-6.

Kim, Sumin, Junghoon Cha, Sughwan Kim, Kyung Won Park, Dong Ryeol Lee, and Jae Hun Jo. 2014. "Improvement of Window Thermal Performance Using Aerogel Insulation Film for Building Energy Saving." Journal of Thermal Analysis and Calorimetry 116 (1): 219-24. https://doi.org/10.1007/s10973-013-3521-5.

Kosny, Jan, Shukla Nitin, and Fallahi Ali. 2014. "Aerogel Thermal Insulation—Technology Review and Cost Study for Building Enclosure Applications." Ashrae 120: 294-307.

Lolli, Nicola, and Inger Andresen. 2016. "Aerogel vs. Argon Insulation in Windows: A Greenhouse Gas Emissions Analysis." Building and Environment 101: 64-76. https://doi.org/10.1016/j.buildenv.2016.03.001.

Lorenzati, Alice, Stefano Fantucci, Alfonso Capozzoli, and Marco Perino. 2015. "Coupling VIPs and ABPs: Assessment of Overall Thermal Performance in Building Wall Insulation." Energy Procedia 78: 2760-65. https://doi.org/10.1016/j.egypro.2015.11.620.

Maleki, Hajar, Luisa Durães, and António Portugal. 2014. "An Overview on Silica Aerogels Synthesis and Different Mechanical Reinforcing Strategies." Journal of Non-Crystalline Solids 385: 55-74. https://doi.org/10.1016/j.noncrysol.2013.10.017.

Morelli, Martin, Leif Rønby, Svend Erik Mikkelsen, Maja G. Minzari, Troels Kildemoes, and Henrik M. Tommerup. 2012. "Energy Retrofitting of a Typical Old Danish Multi-Family Building to a 'Nearly-Zero' Energy Building Based on Experiences from a Test Apartment." Energy and Buildings 54 (2012): 395-406. https://doi.org/10.1016/j.enbuild.2012.07.046.

Ng, Serina, Bjørn Petter Jelle, Linn Ingunn Christie Sandberg, Tao Gao, and Ólafur Haralds Wallevik. 2015. "Experimental Investigations of Aerogel-Incorporated Ultra-High Performance Concrete." Construction and Building Materials 77: 307-16. https://doi.org/10.1016/j.conbuildmat.2014.12.064.

Reim, M., A. Beck, W. Körner, R. Petricevic, M. Glora, M. Weth, T. Schliermann, J. Fricke, Ch Schmidt, and F. J. Pötter. 2002. "Highly Insulating Aerogel Glazing for Solar Energy Usage." Solar Energy 72 (1): 21-29. https://doi.org/10.1016/S0038-092X(01)00086-X.

Rostam, N. Gholami, M. J. Mahdavinejad, and M. Gholami Rostam. 2015. "Commercializing Usage of Nano-Insulating Materials in Building Industry and Future Architecture." Procedia Materials Science 11: 644-48. https://doi.org/10.1016/j.mspro.2015.11.004.

Rubin, Michael, and Carl M. Lampert. 1983. "Transparent Silica Aerogels for Window Insulation." Solar Energy Materials 7 (4): 393-400. https://doi.org/10.1016/0165-1633(83)90012-6.

Sadineni, Suresh B., Srikanth Madala, and Robert F. Boehm. 2011. "Passive Building Energy Savings: A Review of Building Envelope Components." Renewable and Sustainable Energy Reviews 15 (8): 3617-31. https://doi.org/10.1016/j.rser.2011.07.014.

Schultz, J. M., and K. I. Jensen. 2008. "Evacuated Aerogel Glazings." Vacuum 82 (7): 723-29. https://doi.org/10.1016/i.vacuum.2007.10.019.

Schultz, J. M., K. I. Jensen, and F. H. Kristiansen. 2005. "Super Insulating Aerogel Glazing." Solar Energy Materials and Solar Cells 89 (2-3): 275-85. https://doi.org/10.1016/j.solmat.2005.01.016.

Sun, J., J. P. Longtin, and P. M. Norris. 2001. "Ultrafast Laser Micromachining of Silica Aerogels." Journal of Non-Crystalline Solids 281 (1-3): 39-47. https://doi.org/10.1016/S0022-3093(00)00426-9.

Tewari, Param H., Arlon J. Hunt, and Kevin D. Lofftus. 1985. "Ambient-Temperature Supercritical Drying of Transparent Silica Aerogels." Materials Letters 3 (9-10): 363-67. https://doi.org/10.1016/0167-577X(85)90077-1.

Thiel, Cassandra L., Nicole Campion, Amy E. Landis, Alex K. Jones, Laura A. Schaefer, and Melissa M. Bilec. 2013. "A Materials Life Cycle Assessment of a Net-Zero Energy Building." Energies 6 (2): 1125-41. https://doi.org/10.3390/en6021125.

Venkataraman, M., R. Mishra, T. M. Kotresh, J. Militky, and H. Jamshaid. 2016. "Aerogels for Thermal Insulation in High-Performance Textiles." Textile Progress 48 (2): 55-118. https://doi.org/10.1080/00405167.2016.1179477.

(56) References Cited

OTHER PUBLICATIONS

Virta, Mikko. 2016. "Mikko Virta Energy Efficient Shape Optimization of Multiple Buildings." https://aaltodoc.aalto.fi/bitstream/handle/123456789/24006/master_Virta_Mikko_2016.pdf?sequence=1, 58 pages.

Walker, Rosanne, and Sara Pavía. 2015. "Thermal Performance of a Selection of Insulation Materials Suitable for Historic Buildings." Building and Environment 94 (P1): 155-65. https://doi.org/10.1016/j.buildenv.2015.07.033.

Wittwer, V. 1992. "Development of Aerogel Windows." Journal of Non-Crystalline Solids 145 (C): 233-36. https://doi.org/10.1016/S0022-3093(05)80462-4.

Ye, Yunyang, Wangda Zuo, and Gang Wang. 2019. "A Comprehensive Review of Energy-Related Data for U.S. Commercial Buildings." Energy and Buildings 186. Elsevier B.V.: 126-37. doi:10.1016/j.enbuild.2019.01.020.

Zagorskas, Jurgis, Edmundas Kazimieras Zavadskas, Zenonas Turskis, Marija Burinskiene, Andra Blumberga, and Dagnija Blumberga. 2014. "Thermal Insulation Alternatives of Historic Brick Buildings in Baltic Sea Region." Energy and Buildings 78: 35-42. https://doi.org/10.1016/j.enbuild.2014.04.010.

\* cited by examiner

100

104

102

102

120

AEROGEL HYBRID CONTAINING RESIN MIXTURE, PROCESS FOR ITS PRODUCTION AND USE

PRIORITY STATEMENT

This application claims priority under 35 U.S.C. § 119 to provisional application Ser. No. 63/020,647 titled "AEROGEL HYBRID CONTAINING RESIN MIXTURE, PROCESS FOR ITS PRODUCTION AND USE" and filed on May 6, 2020 all of which is hereby incorporated by reference in its entirety.

FIELD OF THE DISCLOSURE

The present disclosure relates to an aerogel hybrid containing resin mixture, process for its preparation and use. More particularly, but not exclusively, the present disclosure relates to an aerogel hybrid containing resin mixture with the ability to fit large amounts of aerogel into the resin to enhance the aerogel's physical properties.

BACKGROUND

Aerogels are a porous gelatinous like material that may solidify into a strong solid with excellent insulating properties. Aerogels contain numerous pockets giving the aerogels the ability to be extremely light weight. Typically, aerogels can either be hydrophobic or hydrophilic and are often made of silica. Due to the manufacturing technique, aerogel can be extremely costly and extremely brittle or may be easily harmed in several exposed conditions. Increasing the crosslinking of a resin and aerogel hybrid and increasing the amount of resin into an aerogel are unresolved challenges.

Therefore, what is needed is an aerogel hybrid containing resin mixture and aerogel that addresses these and other deficiencies.

SUMMARY

Therefore, it is a primary object, feature, or advantage of the present disclosure to improve over the state of the art.

It is a further object, feature, or advantage to provide a mixture of a resin mixture or binder and aerogel wherein the resin mixture surrounds and protects the aerogel.

It is another object, feature, or advantage to formulate an aerogel hybrid with high resistance.

It is a still further object, feature, or advantage to formulate an aerogel with increased toughness.

Another object, feature, or advantage is to provide an aerogel hybrid wherein the aerogel particles are densely packed together.

Still another object, feature, or advantage is to provide an aerogel hybrid containing resin mixture with the ability to fit large amounts of resin into aerogel to enhance the resin's physical properties In one exemplary aspect of the present disclosure, an aerogel hybrid formulation is disclosed. The aerogel hybrid formulation includes, for example, a resin mixture having at least two or more components including a reactive diluent, and a plurality of aerogel particles having interstitial spaces. The resin mixture surrounds the aerogel particles and further fills interstitial spaces between the plurality of aerogel particles.

In another aspect of the present disclosure a method for producing an aerogel hybrid is disclosed. The method includes, for example, preparing a plurality of aerogel particles, preparing a resin mixture having at least two or more components including a reactive diluent, blending the plurality of aerogel particles with the resin mixture to form an aerogel hybrid formulation, and curing the aerogel hybrid formulation until solidification into a first layer.

In at least one other aspect of the present disclosure, a method for increasing the amount of resin into an aerogel is disclosed. The method includes, for example, preparing a plurality of aerogel particles having interstitial spaces, preparing a resin mixture having at, least two or more components including a reactive diluent, and mixing the plurality of aerogel particles with the resin mixture filling the interstitial spaces for forming an aerogel hybrid formulation.

One or more of these and/or other objects, features, or advantages of the present disclosure will become apparent from the specification and claims that follow. No single embodiment need provide each and every object, feature, or advantage. Different embodiments may have different objects, features, or advantages. Therefore, the present disclosure is not to be limited to or by any objects, features, or advantages stated herein.

BRIEF DESCRIPTION OF THE DRAWINGS

Illustrated embodiments of the disclosure are described in detail below with reference to the attached drawing figures, which are incorporated by reference herein.

DETAILED DESCRIPTION

The disclosure is not to be limited to the particular aspects described herein. In particular, the disclosure contemplates numerous variations in aerogel-resin mixtures and mixture. The foregoing description has been presented for purposes of illustration and description. It is not intended to be an exhaustive list or limit any of the disclosure to the precise forms and aspects disclosed. It is contemplated that, other alternatives or exemplary aspects are considered included in the disclosure. The description is merely examples of formulations, components, constructs, processes or methods of the disclosure. It is understood that any other modifications, substitutions, and/or additions can be made, which are within the intended spirit and scope of the disclosure.

Figure 1:
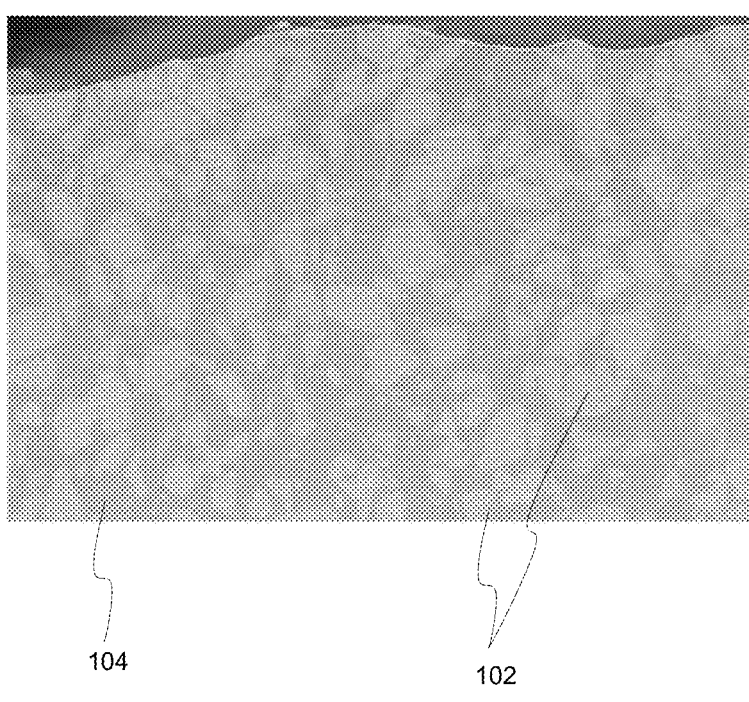
FIG. 1 is an image of an aerogel hybrid mixture in accordance with an exemplary aspect of the present disclosure.

In one aspect of the present disclosure, an aerogel hybrid mixture 100, as shown in FIG. 1, is disclosed. The aerogel hybrid mixture 100 includes aerogel particles 102, and at least one binder. For example, the binder may be a resin mixture 104. A method and a composition for producing the aerogel mixture 100 and the use of the mixture material are also disclosed.

Aerogel 102 is defined as a gel having a microporous solid structure in which the dispersed phase is a gas. Aerogels 102 are dried gels with high porosity, low flammability, and are water repellant, translucent, and lightweight. Aerogels 102 are a porous gelatinous like material that when solidified is a strong solid material with excellent insulating properties. Aerogel 102 contains numerous air pockets, making the aerogel 102 extremely light weight. Due to the manufacturing technique, aerogel 102 can be extremely costly. Due to these factors, what is needed is a resin composition 104 with good resistance and toughness to surround and better protect the aerogel.

Therefore, at least one object of the disclosure is to provide an aerogel hybrid mixture 100, as shown in FIG. 1, which, with a binder such as a resin 104, has an improved resistance and toughness.

Beneficially, aerogels 102 can also nullify the two methods of heat transfer, namely conduction and convection. Aerogels 102 are considered good conductive insulators because the aerogel is composed entirely of poor heat conducting gases. Silica aerogels 102 are very good thermal insulators due to the silica pockets being a poor heat conductor. Aerogel is a good convective inhibitor, air cannot circulate through the lattice structure of the aerogels 102.

Resin 104 may be blended with or coated onto the aerogel and can then be cured to reinforce the aerogel 102. In some aspects, the resin 104 must be sufficiently reactive with free radicals to insure solidification and curing of the aerogel hybrid 100. The resin 104 used as the binding material in one aspect of the disclosure is UV-curable resin mixture 104 or visible light curable resin. Curing of the resin mixture 104 can take place using free radicals. Free radical resin mixtures include, for example, urethane acrylate, epoxy acrylate, polyester acrylate or other suitable types of free radical resins. Other than ultraviolet or visible photoinitiation, the free radicals can be generated using heat and redox chemistry. Other possible curing chemistries that could be used can include, for example, epoxy, urethane, cyanoacrylate, and other suitable curing chemistries. In some aspects of the disclosure the resin 104 may be cured using a hardener additive or environment-sensitive resins, such as those sensitive to temperature, pressure, moisture, exposure, and other conditions. In other aspects of the disclosure, pressure sensitive adhesives may be used to bind the resin with the aerogel. In another aspect, the resin can be a heat-curable resin using heat-curable initiators.

Preparation of the Aerogel

Figure 7:
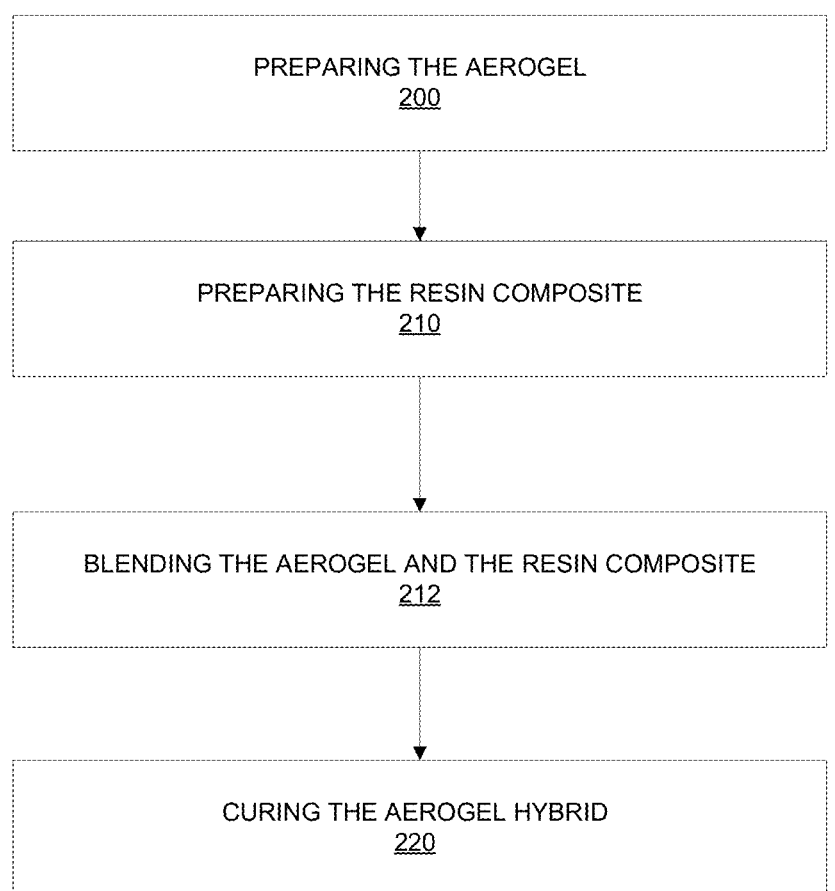
FIG. 7 is a flowchart of illustrating exemplary steps for producing the aerogel hybrid mixture.
Figure 8:
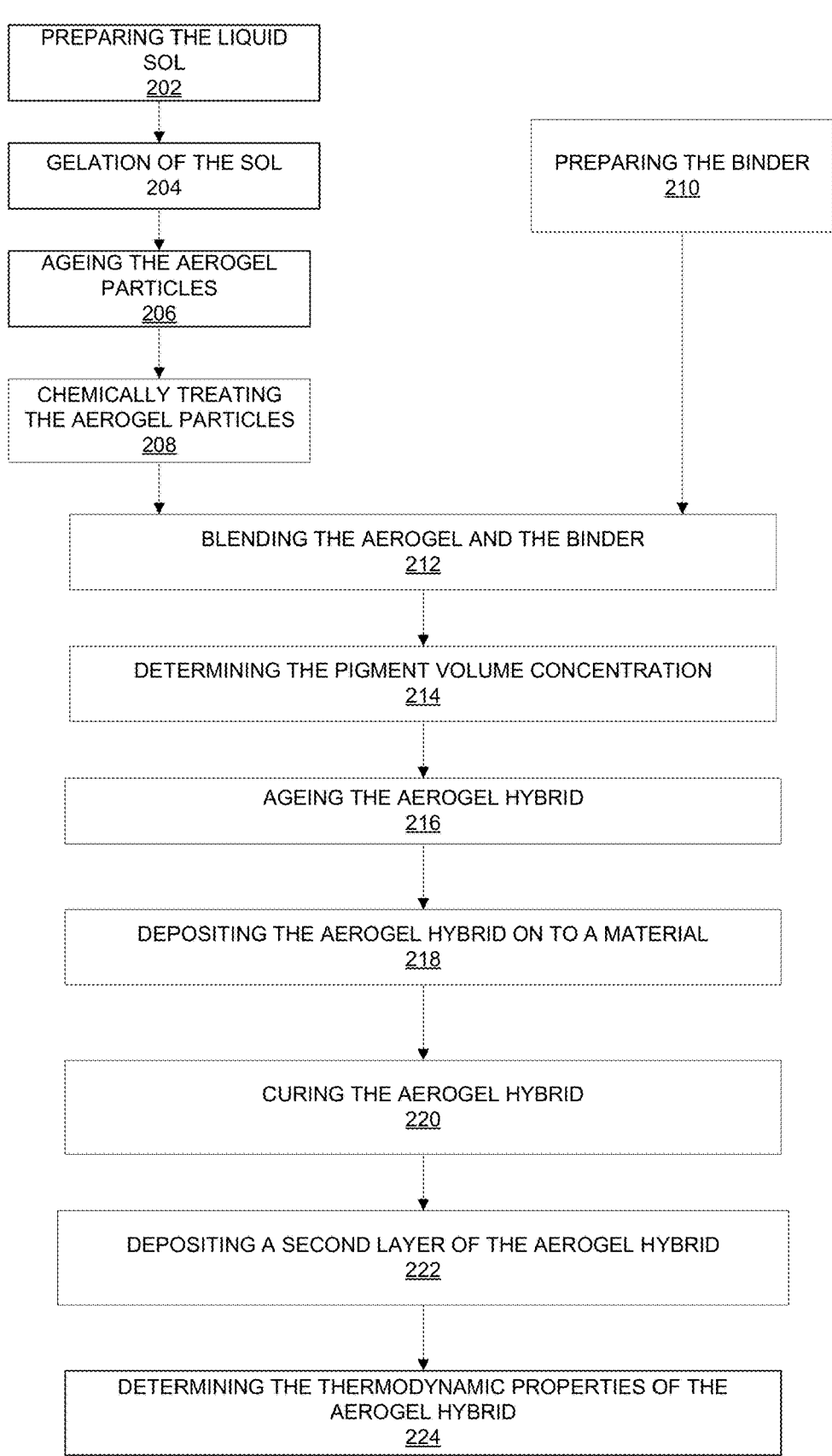
FIG. 8 is another flowchart illustrating exemplary steps for producing the aerogel hybrid mixture.

In one aspect of the present disclosure the aerogel is prepared (Step 200), as shown in FIG. 7 and FIG. 8. For at least one aspect of formulation, a silica aerogel 102 is used. In silica-based aerogels, small molecules are used to produce solid materials within an in-gel solution and silica alkoxides. The silica-based aerogel can, for example, range in size, such as 2-40 μm, 100-700 μm and 100-1200 μm-sized particles. In at least one preferred aspect, silica-based aerogels ranging from 2-40 μm may be used. Although aerogel is often silica based, the present disclosure contemplates aerogels made from other products such as metal oxides, carbon, and organic polymers. According to at least one formulation, four chemicals, such as, silicon alkoxides, tetraethoxysilane Si(OC2H5)4, tetramethoxysilane Si(OCH3)4, and polyethoxydisiloxane SiOn (OC2H5)4-2n may be used to form a solution. The solution may contain one or more of the four chemicals or be comprised of different chemicals. Aerogels 102 consist of a solid framework of gel, which is isolated from its own liquid medium and, for silica aerogels, these nanoparticles may be grown into liquid directly with gelation. The size and density of the aerogel 102 pores may be controlled during the preparation of the gel. The aerogel may also be a carbon or organic aerogel or a metal/metal oxide aerogel. The aerogel may also be metal chalcogenide aerogels.

The aerogel particles 102 may be prepared by starting with a liquid solution, such as sodium silicate. Sulfuric acid is added to the sodium silicate to produce a liquid silica sol (Step 202) as shown in FIG. 8. The liquid silica sol may be dropped or poured into a second solution containing an oil and an ammonia solution. The oil may be a paraffin oil. The gelation of the silica sol may begin immediately upon contact with the oil and ammonia solution forming silica gel particles 102 (Step 204), as shown in FIG. 8. The silica gel particles 102 may be aged in a water solution to remove any salt from the silica gel particle 102 pores (Step 206), as shown in FIG. 8. After the salt is removed from the pores of the aerogel particles 102, the aerogel particles 102 may be soaked in ethanol. The aerogel particles 102 can then be placed in a sialylation solution to make the aerogel particles 102 hydrophobic.

In other aspects, the aerogel 102 can be prepared by carefully hydrolyzing a respective metal alkoxide in a solvent. A very dry solvent and tightly controlled amounts of water may be used due to the sensitivity of the metal alkoxide. Cryogenic temperatures may be used to slow the reaction rates down to a productive speed. During the reaction the alkoxide groups are hydrolyzed to hydroxyl groups. The hydroxyl groups from two molecules condense, creating a metal-oxygen-metal bridge. A metal oxide sol is formed which can be crosslinked into a metal oxide gel. The gel is purified, aged and super critically dried.

Polymer aerogels 102 are prepared by starting with a solution containing small molecules with the ability to link together (polymerize) to form larger molecular clusters. The larger molecular clusters then grow into nanoparticles that are dispersed throughout the solution. The nanoparticles are induced to interconnect or cross-link with each other, forming a continuous network of nanoparticles. The network spans the entire volume of the liquid solution forming a gel. In some cases, the resorcinol (1,3-dihydroxy benzene) is polymerized with formaldehyde (methanal) in a water solution. A catalyst may be added to speed up the reaction time, such as potassium or sodium carbonate. The reaction may be left out at room temperature or stored in a sealed container and placed in the oven for a certain amount of time. During this time the nanoparticles cross-link with each other to form a mesoporous network spanning the volume of the solution, thereby forming a gel. The gel is purified and then undergoes supercritical drying. The gel can be purified by a few soakings in water and then a few soakings in a polar organic such as acetone or ethanol.

Carbon aerogels can be prepared by selecting an organic aerogel and placing the aerogel in a furnace such as a box furnace or a quartz tube inside an electric clamshell furnace. Inert gas flows through the furnace, such as nitrogen or argon gas. The gas may flow into the furnace through the entire process. The furnace is heated to a target temperature for a certain amount of time. During that time the organic polymer of the aerogel expels much of its non-carbon content. This may include oxygen, hydrogen or nitrogen. After the expulsion the aerogel is left with a carbonized skeleton. Aerogel are generally hydrophobic. However, aerogels 102 are sometimes hydrophilic and when the aerogel 102 absorbs water the aerogel may suffer a structural change. In some instances, the aerogel 102 may deteriorate. If the aerogel 102 is hydrophilic chemical treatments may be used to make the aerogel particles hydrophobic (Step 208), as shown in FIG. 8. Chemical treatment may include soaking the aerogel particles 102 in a chemical treatment with a base or an acid to replace the surface hydroxyl groups on the aerogel particles 102 with non-polar groups. The non-polar group may be an aliphatic group. Carbon dioxide may also be introduced into the gel. After the carbon dioxide reaches its super critical point it can be vented out. The carbon dioxide may be vented out during the aging process (step 216), as shown in FIG. 8. This process may be repeated numerous times. In some aspects of the present disclosure only the exterior or interior of the aerogel 102 is hydrophobic. In other instances, both the exterior and the interior are hydrophobic. After the aerogel chemical undergoes hydrolysis the aerogel particles may undergo condensation to form the aerogel particles 102, as shown in FIG. 2.

There are two types of aerogels 102: monolithic and granular. Monolithic silica aerogel 102 is a material with an excellent combination of high solar transmittance and low thermal conductivity. In at least one aspect the aerogel is a silica aerogel. Ultrafine aerogel particles 102, as shown in FIG. 2, provide improved mechanical stability with respect to the formation of breaks and cracks. Although a silica gel is discussed, other gel materials are contemplated, such as metal oxides, carbon, and organic polymers. After the aerogel 102 is synthesized, the aerogel is a solid or rigid material. Extreme pressing on the aerogel 102 may cause the aerogel to become friable. Therefore, by mixing the aerogel 102 with resin 104 causes the aerogel to become surrounded, and better protected from cracking or breaking apart. Even though the aerogels 102 are prone to shattering, aerogels are very strong structurally. The dendritic microstructure of the aerogels 102 creates strong load bearing capabilities. The aerogel's 102 dendritic microstructure is the result of sol-gel polymerization wherein the monomers react with one another to form a sol structure consisting of bonded cross-linked macromolecules.

Figure 2:
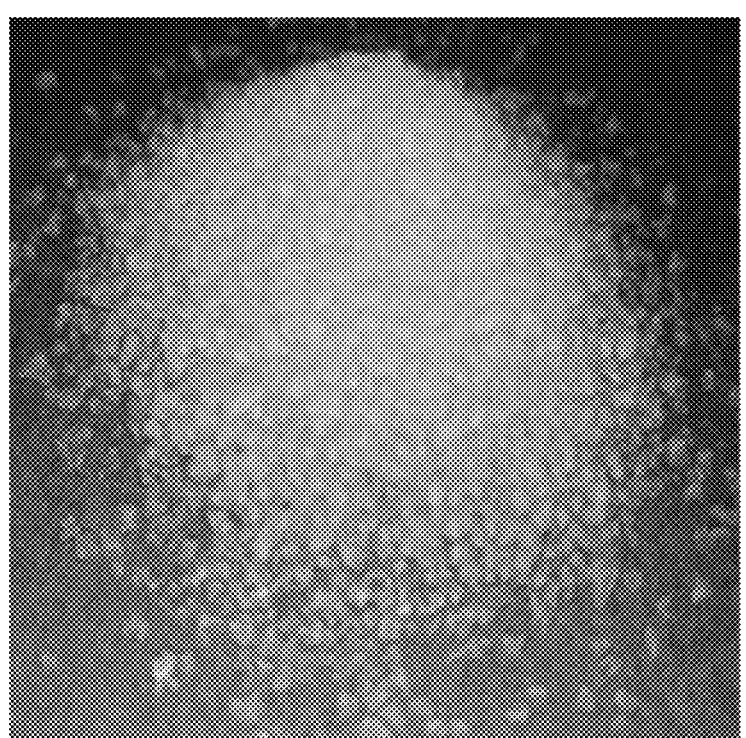
FIG. 2 is an image of silica aerogel particles.
Figure 3:
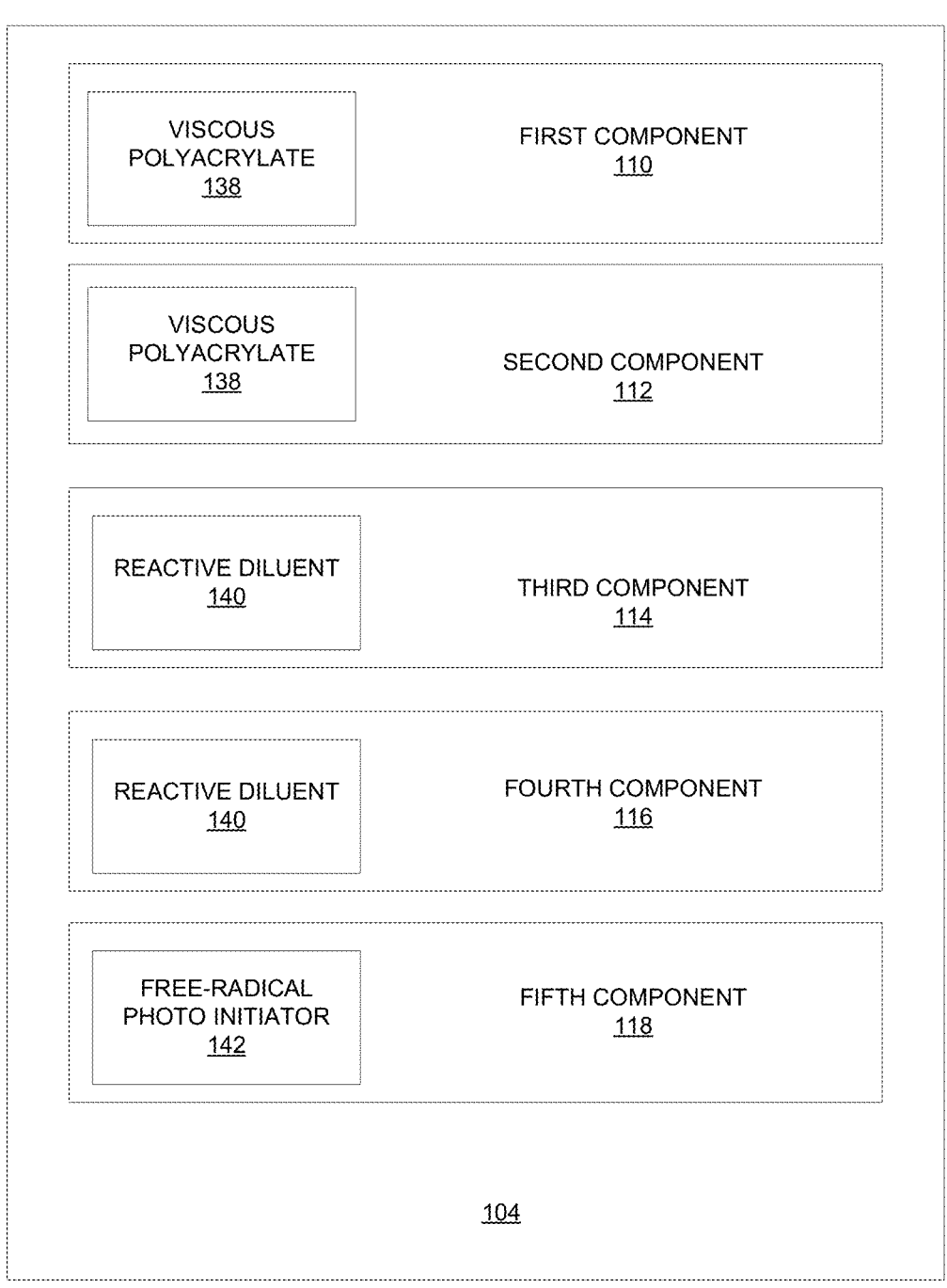
FIG. 3 is a pictorial representation illustrating a resin composition in accordance with an exemplary aspect of the present disclosure.
Figure 4:
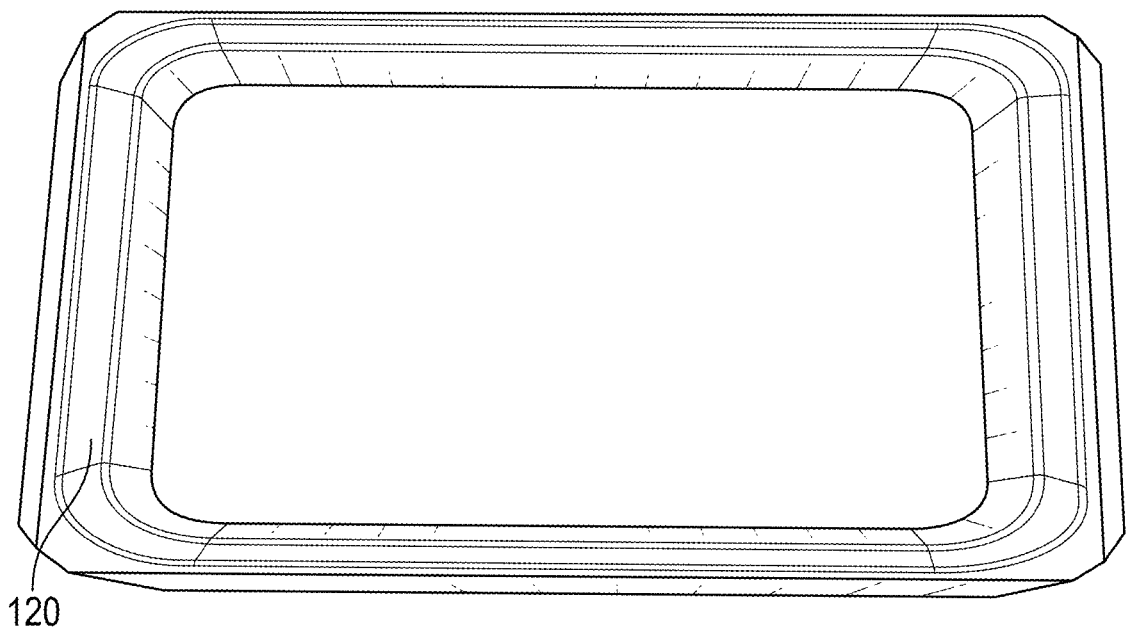
FIG. 4 is an image of a draw-down bar according to an exemplary aspect.

In some aspects of the present disclosure the particle 102 size of the aerogel 102 is ultrafine, as shown in FIG. 2. In other aspects of the present disclosure the aerogel particle 102 size may be larger or smaller. The use of ultrafine aerogel particles 102 results in a more homogeneous distribution in the overall composition, which leads to the fact that the mixture material has an almost uniform, low thermal conductivity. In some aspects of the present disclosure the particles 102 may be spherical in nature and range in size, such as 2-40 μm, 100-700 μm and 100-1200 μm, sized particles. In at least one preferred aspect, silica-based aerogels ranging from 2-40 μm may be used. The particles 102 are fused together in clusters to form a three-dimensional porous structure. The clusters of particles 102 form fractural chains. The size and density of the aerogels 102 pores may be controlled during the manufacturing process. The smaller the pore size the more likely the aerogel 102 is to fracture. By blending the aerogel 102 with the resin 104, the aerogel 102 is better protected from cracking or breaking apart even with the smaller pore size.

The porosity of the aerogel 102 can be determined by gas absorption, mercury porosimetry and scattering method. The gas method includes determining the volume of the gas absorbed. The gas absorbed is dependent on the pore size and the saturation pressure of the gas. The mercury porosimetry includes forcing mercury into the aerogel pores to determine the size. The scattering method includes sending radiation, such as x-rays, into the aerogel to determine the fractal geometry of the pore network.

In one aspect of the present disclosure the pH of the aerogel 102 may range from 3.0 to 6.5. The pH level of the aerogel 102 may be higher or lower. The melting point of the aerogel 102 is 1700° C. after partial decomposition. Melting points may vary based on the type of aerogel. For example, the melting point of the aerogel 102 may have a higher or lower temperature. In one aspect, the aerogel 102 had a boiling point of 2230° C. after partial decomposition. Boiling point temperatures may vary based on the type of aerogel. For example, the aerogel 102 may have a higher or lower boiling point temperature. The aerogel 102 may have an explosion limit in air of 220 mg/m³. The aerogel's 102 explosion in air limit may be higher or lower depending on, the type of aerogel. The aerogel 102 may have an autoignition temperature of 550° C. Similarly, the autoignition temperature of the aerogel 102 may be higher or lower depending on the type of aerogel.

Preparation of the Resin

In at least one aspect of the disclosure the resin 104 is prepared (Step 210), as shown in FIGS. 7 and 8. The resin 104 may be an epoxy resin, a casting resin, a coating resin, a polyurethane resin, or a polyester resin. The epoxy resin may contain a diepoxy cross-linked to a diamine. The diamine may cure the diepoxy. If the resin 104 is a casting epoxy resin the resin 104 may have a low viscosity and a thin consistency. If the resin 104 is a polyurethane resin, the resin 104 may be comprised of copolymers made of polyol and isocyanate components. The polyurethane resin 104 may have excellent adhesion properties with various substrates 106 as well as high elasticity. Polyester resins are formed by the reaction of dibasic organic acids and polyhydric alcohols.

The resin 104 maybe sufficiently reactive with the curing agent 118, such as free radicals, to insure solidification of the aerogel. The free radicals may be generated from UV light, visible light, heat or redox chemistry. The resin 104 used as the binding material in one aspect of the disclosure is resin mixture 104. The free radical resin mixtures may include urethane acrylate, epoxy acrylate, polyester acrylate or other suitable types of free radical resins. Other than ultraviolet or visible photoinitiation, the free radicals can be generated using heat and redox chemistry. Resin mixtures 104 with curing agents other than those which are UV-curable with free radicals may be used, such as, for example, cyanoacrylate, where the acryl groups undergo chain growth polymerization after exposure to suitable environmental conditions. The disclosure contemplates that resins may be cured through free radicals. These free radicals can be generated by UV light, visible light, or heat.

In some aspects the curing is due to the addition of an additive. The additive may be a hardener such as polyamines. The resin 104 may be cured using a hardener additive such as epoxy resin mixtures or polyester resin mixtures or the resin may be combined with environment-sensitive additives. The resin 104 may also be cured by the addition of a crosslinker which increases the amount of cross links between the resin polymers to make the resin 104 more rigid and durable.

Environment-sensitive additives can include, for example, those sensitive to temperature, pressure, moisture, exposure, and other conditions. For example, a pressure sensitive adhesive may be used to bind the resin 104 with the aerogel 102. In another example, the resin 104 can be a heat-curable resin using heat-curable initiators. In other aspects, pressure treated resin 104 may be used to bind the resin 104 with the aerogel 102. Any suitable mixer or suitable mixing method can be used for mixing the components of the resin mixture together.

Other additives may include a colorant or optical brightener to add color, special effects including florescence or adding a pattern to the resin. An antimicrobial additive may be added to control the buildup of bacteria, fungi, or algae on the surface of the aerogel hybrid 100 or the substrate 106 the hybrid is placed on. Antistatic additives may be added to decrease the static electricity conduction. UV stabilizers may be added to protect the resin 104 from selective UV rays, not used for curing, to lessen the degradation of the aerogel hybrid over time. If the resin needs to become more flexible or pliable plasticizers may be added. If the resin 104 needs to have added strength or stiffness fibers or impact modifiers may be added to the mixture. Flame retardants may be added to make the aerogel hybrid 100 more flame resistant. Lubricants, thickeners, or diluents can be added to help evenly distributed the resin 104 or increase or lower the viscosity of the resin. Antioxidants can be added to help the resin 104 withstand wear and tear if the resin 104 or aerogel hybrid 100 is exposed to the elements. Foaming agents or blowing agents may be added to added air pockets to the resin 104. The foaming agents may be chemicals such as carbonates, bicarbonates, hydrazides, and other suitable agents or the like which decompose and liberate gases. The chemical agents in the foaming agent may also react with resins/hardeners and release the gases necessary for the foaming action.

In some aspects of the present disclosure the resin mixture 104 may be formulated from multiple components. For example, the resin mixture 104 may be formulated from one or more of the following materials: 1,6 Hexanediol diacrylate (HDDA); Ebecryl 18402; Ebecryl 220; Trimethylolpropane Triacrylate (TMPTA); and Omnirad. The resin mixture 104 may be formulated from different materials than those enumerated. The resin mixture 104 may be a UV-initiated free radical polymerization of polyacrylate monomers/oligomers. The resin mixture 104 has many monomers with vinyl groups that can react with free radical-containing species and rapidly form a highly crosslinked network.

The resin mixture 104 may have viscous polyacrylates. The polyacrylates may include urethane to increase solvent resistance and toughness. In at least one aspect, the resin mixture 104 has a first component 110. The first component 110 includes, for example, a first viscous polyacrylate 138. The resin mixture 104 may include a second component 112. The second component may include, for example, a second viscous polyacrylate 138. The Ebecryl components of the resin mixture 104 may be a first viscous polyacrylate 138 and a second viscous polyacrylate 138 that also have urethane, which gives good solvent resistance and toughness. Examples of oligomer resins are epoxy acrylates, aromatic urethane acrylates, aliphatic urethane acrylates, polyester acrylates, acrylated acrylic, acrylated polyethers, acrylated ethoxylated diols, methacrylated resins and the like. The resin mixture 104 may include one or more reactive diluents to lower the viscosity of the other components of the resin mixture 104. The reactive diluents may have acrylate functionality allowing the components to become part of the polymer network. The resin mixture 104 may include a third component 114. The third component may include, for example, a first reactive diluent 140. The resin mixture 104 may also include a fourth component 116. The fourth component 116 may include, for example, a second reactive diluent 140. In one aspect, TMPTA is the third component 114 of the resin mixture. The TMPTA may be the first reactive diluent 140. The HDDA may be a fourth component 116 of the resin mixture 104. The HDDA may be the second reactive diluent 140. The TMPTA and HDDA may have acrylate functionality and can become part of the network. Reactive diluents are used to provide viscosity reduction and crosslinking to the cured substrate 106. Examples of reactive diluents are hexanedioldiacrylate, dipropylene dial diacrylate, tripropylene glycol diacrylate, trimethylolpropane triacrylate, pentaerythritol triacrylate, pentaerythritol tetraacrylate, trimethylolpropane ethoxy triacrylate, and the like. Mixtures of diluents may be used. The resin mixture 104 may include a fifth component 118. The fifth component 118 may include, for example, a free-radical photo initiator 142. The free-radical photo initiator 142 rapidly decomposes when it is exposed to UV light. The free-radical photo initiator 142 reacts with the vinyl groups on the monomers of the aerogel, such that the monomers become macroradicals. The macroradicals react with other vinyl groups. The reactions may continue until a solid coating remains. In one aspect, Omnirad may be the fifth component 118 of the resin mixture 104. The Omnirad may be a free-radical photo initiator 142. Any free-radical UV curable oligomer resin and/or reactive diluent could be used in the preparation of the UV curable formulation for this invention.

Blending the Aerogel and the Binder Together

In one aspect of the present disclosure the aerogel and resin are blended together (Step 212) as shown in FIGS. 7 and 8. The blending may thoroughly pack super small aerogel 102 closely together within in resin mixture 104 as the "binder". Being closely packed in a resin 104 allows the aerogel hybrid 100 to provide better thermal properties.

The aerogel 102 and resin mixture 104 may be blended together simultaneously or one of the components of the resin mixture 104 may be introduced first and the rest of the components introduced subsequently. Any suitable mixer and suitable mixing method can be used for the blending. In one aspect, a hand stirrer is used to mix the resin mixture 104 and the aerogel 102. The blending may be continued until the aerogel particles 102 are evenly distributed or nearly distributed within the resin mixture 104. The blending process may be regulated by the duration of the blending as well as the speed of the mixer. In one aspect, the aerogel 102 volume concentration may be mixed with 100 mL of the resin mixture 104.

During the blending process, the aerogel 102 and resin mixture 104 may undergo a chemical reaction binding the resin 104 to the aerogel 102. The chemical reaction may include hydrogen bonding, crosslinking, or polymerization. The crosslinking may be component specific. The first component 110 of the resin 104 may cross link to the aerogel or it may be the second component 112, third component 114, fourth component 116 or fifth component 118. An additive in the resin 104 may increase the cross linking between the resin 104 and the aerogel 102. The viscosity of the resin 104 may be increased or decreased to help the resin 104 coat and crosslink to the aerogel particles 102. The resin 104 and aerogel may continue cross-linking until the aerogel is completely wetted by the resin 104 forming the aerogel hybrid 100. The resin 104 may be partially absorbed by the aerogel 102 or the aerogel 102 may be partially absorbed by the resin 104. For example, the resin 104 may partially engross the aerogel particles 104 or wet out the surface of the aerogel particles 102. In other examples the resin 104 does not absorb the aerogel particles 102 and instead coats the outside of the surface of the aerogel particles 102. A surfactant may be added to the resin 104 or aerogel 102 to aid in the binding and wetting of the aerogel 102 to the resin

104 or vice versa. The surfactant may have primary or secondary amino groups and be on the surface of the resin 104 or the surface 144 of the aerogel. The primary and secondary amino groups may form hydrogen bonds with the resin 104 or the aerogel 104. The surface treatment may also promote, speed up, or permit the resin 104 wetting or binding to the aerogel particle 102. For example, a surface treatment may promote the resin 104 cross-linking to the aerogel particles 102.

In some aspects, there is no chemical reaction between the resin 104 and the aerogel when forming the aerogel hybrid. The resin's chemical mixture does not cross link to the aerogel. The resin 104 may physically coat the outside or surface 144 of the aerogel particles 102. The resin 104 acts as a physical layer without any absorption or chemical addition to the aerogel particles 102, simply encapsulating the aerogel particle 102. If the aerogel particles 102 have any type of surface treatment, the surface treatment may affect the ability of the resin 104 to wet the aerogel particles 102. The surface treatment may aid in helping the resin 104 blend with the aerogel particles 102 such as by the addition of a cross-linker to bind the resin 104 to the aerogel particles. The surface treatment may also inhibit, slow down or prevent the resin 104 from wetting or binding to the aerogel particle 102. For example, a surface treatment may prevent the resin 104 from cross-linking to the aerogel particles 102.

According to one aspect, resin mixture 104 completely wets the aerogel particles 102 to form the aerogel hybrid 100. In another aspect, the aerogel particles are only partially wetted with the resin mixture 104. The aerogel particles 102 may be packed closely together within the resin mixture 104. The reactive diluent components of the resin mixture 104 may lower the viscosity of the other components of the resin mixture 104. The reactive diluents may also become components of the aerogel hybrid 100 after blending with the aerogel 102. Being closely packed or minimizing the gap in the resin mixture 104 may allow the aerogel hybrid 100 to provide better thermal properties. The approximate amount of aerogel 102 blended with the resin mixture 104 can be calculated to determine the pigment volume concentration (PVC) (Step 214), as shown in FIG. 8. The pigment volume concentration determines the amount of resin 104 needed to fill the interstitial voids between the aerogel particles 102 and wet the surface area of all the aerogel particles. If the critical pigment volume concentration (CPVC) is greater than the PVC, more resin 104 may be added or needed to fill the interstitial voids between the aerogel particles 102. If the aerogel hybrid 100 has significantly more resin 104 than aerogel, the aerogel hybrid 100 may be less efficient at insulating. The resin 104 may also be more rigid, stiff or have a higher resistance than desired. If the PVC is greater than the CPVC, there is not enough resin 104 to wet the aerogel particles 102 or fill the interstitial voids. The resin 104 can easily break, and the resulting aerogel hybrid 100 may remain brittle. If the aerogel particles 102 have a greater surface area, more resin 104 may be needed to wet the aerogel particles 102. If the surface area is smaller, less resin 104 may be needed to wet the aerogel particles. The PVC is the volume fraction of the pigment in the dried coating film.

$$PVC = \frac{Vp}{V} = \frac{Vp}{Vp + Vb}$$

Vp=pigment or aerogel particle volume
V is the total volume of the coating or aerogel hybrid 100
Vb is the volume of the binder or resin The volume of the aerogel particles, resin 104 or aerogel hybrid 100 may affect the insulating, stiffness, resistance, or rigidity of the resulting aerogel hybrid 100. As the volume of the aerogel particles gets larger, relative to the volume of the aerogel hybrid 100, the PVC gets larger. More resin 104 is needed to fill the interstitial voids and wet all the aerogel particles 102. If the volume is smaller relative to the aerogel hybrid 100, then less resin 104 is needed to fill the interstitial voids and wet the aerogel particles. If the volume of the resin 104 is larger relative to the volume of the aerogel hybrid 100 and the aerogel particles, then the PVC is smaller and less resin 104 is needed to fill the interstitial voids.

If the aerogel hybrid 100 ingredients are given in terms of mass, the mass must be converted to volume using density.

$$PVC = \frac{V_p}{V} = \frac{\dfrac{M_p}{d_p}}{\dfrac{M_p}{d_p} + \dfrac{M_b}{d_b}}$$

Mp=pigment mass or aerogel particle mass
dp=density of the pigment or aerogel particles
Mb=mass of the binder or resin
db=density of the binder or resin The density of the aerogel hybrid 100 may affect the insulating, stiffness, resistance, or rigidity of the resulting aerogel hybrid 100. The density of the resin 104 or aerogel may also affect the properties of the aerogel hybrid 100. If the density of the resin 104 is smaller relative to volume the aerogel particles or the volume of the aerogel particles, then the PVC is smaller. Less resin 104 is needed to fill the interstitial voids and wet the aerogel particles and the insulating properties of the aerogel may be maintained or increase. If the density of the aerogel is larger, relative to the density of the resin 104 then more resin 104 may be needed to fill the interstitial voids and wet the aerogel particles 102. If more resin 104 is used to fill the interstitial voids, the insulating properties of the aerogel may become less efficient due to the spacing between the aerogel particles 102. If the density of the aerogel particles 102 is larger, relative to the mass of the resin 104 or the mass of the aerogel, then the PVC is smaller and less resin 104 is needed to fill the interstitial voids.

The mass of the aerogel particles 102, resin 104, or aerogel hybrid 100 may affect the insulating, stiffness, resistance, or rigidity of the resulting aerogel hybrid 100. If the mass of the aerogel is larger, relative to the density of the aerogel or the mass of the resin 104, then the PVC is smaller and less resin 104 is needed to fill the interstitial voids and wet the aerogel particles 102, thereby maintaining the insulating properties of the aerogel.

If the aerogel particles 102 or the resin 104 have several ingredients, the individual components must be calculated. Conversion from mass to volume may be done before summing the individual components into the PVC equation.

$$PVC = \frac{V_p}{V} = \frac{\sum_i V_{pi}}{\sum_i V_i} = \frac{\sum_i \dfrac{M_{pt}}{d_{pt}}}{\sum_i \dfrac{M_{pi}}{d_{pi}} + \sum_i \dfrac{M_{bi}}{d_{bi}}}$$

The critical PVC is where the pigment, or aerogel, is at its maximum loading while still having all the air between the particles 102. The critical PVC is the concentration with sufficient resin 104 to wet or surround all aerogel particles 102 and fill all the interstitial spaces.

$$CPVC = \frac{1}{1 + (OA)(P)/V}$$

P=density of the aerogel

V=viscosity of the resin

OA=grams of aerogel per gram of resin 104 required to just wet the particles As the density of the aerogel or the grams of aerogel per gram of resin 104 required to wet the particles increases, the CPVC decreases. As the density of the aerogel particles 102 or the grams of aerogel per gram of resin 104 decrease the CPVC increases. As the viscosity of the resin 104 increases, the CPVC increases and as the viscosity of the resin 104 decreases, the CPVC decreases. If the CPVC is greater than the PVC, then more resin 104 may be added or needed to fill the interstitial voids between the aerogel particles 102. If the aerogel hybrid 100 has significantly more resin 104 than aerogel, the aerogel hybrid 100 may be less efficient at insulating. The resin 104 may also be more rigid, stiff, or have a higher resistance than desired. If the PVC is greater than the CPVC, there may not be enough resin 104 to wet the aerogel particles 102 or fill the interstitial voids.

To calculate the CPVC, the density of the aerogel particles 102 may be used to calculate the weight of the aerogel 102 to be added to the resin mixture 104. Other properties of the aerogel 102 may also be used to calculate the weight of the aerogel 102 to add to the resin mixture 104. The viscosity of the resin mixture 104 may also be calculated to determine the CPVC. In at least one aspect, the viscosity of the resin mixture 104 was measured using various volume concentrations with a viscometer. Viscosity measurements may be determined, for example, using a rheometer. The rheometer may use a steady rate sweep from 0-100 rpm. The aerogel hybrid 100 may be placed in between two plates, torque may be applied to the upper plate using a steady rate sweep from 0-100 rpm, and the resulting shear rate may be measured.

Figure 6:
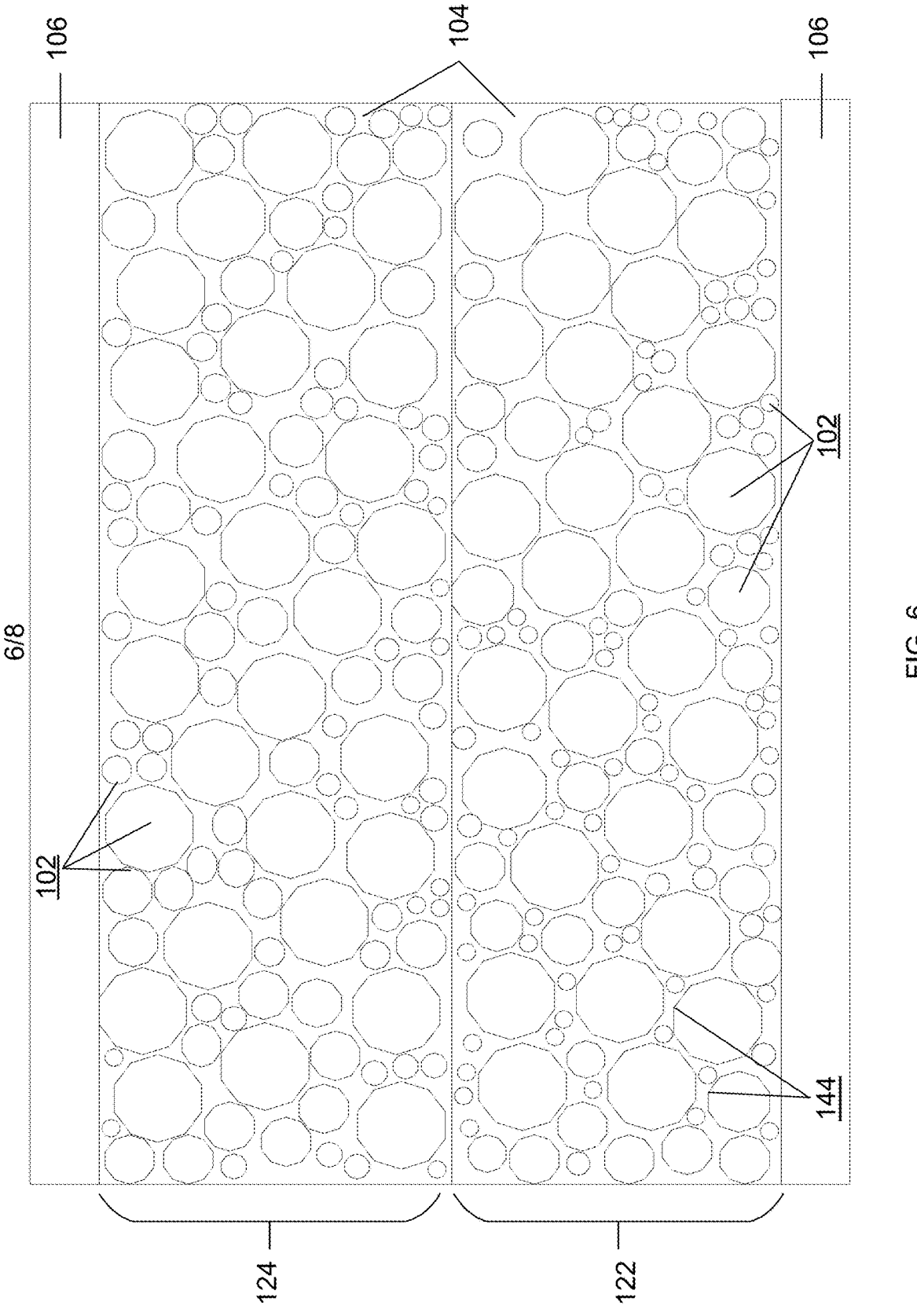
FIG. 6 is an illustration of an aerogel hybrid with multiple layers.

The percentage of aerogel 102 to the resin mixture 104 within the aerogel hybrid 100 may be determined using an imaging software. The higher the percentage of aerogel 102, the more viscous the aerogel hybrid 100 may be prior to curing (Step 212), as shown in FIGS. 6 and 7. In one aspect, the aerogel hybrid 100 may be composed of 10% aerogel 102 and 90% resin mixture 104. The aerogel hybrid 100 may be composed of 0.6 or 0.7 grams of aerogel 102. The aerogel hybrid 100 may be composed of 20% aerogel 102 and 80% resin mixture 104. The aerogel hybrid 100 may be comprised of 1.5 grams of aerogel 102. In other aspects, the aerogel hybrid 100 may include 30% aerogel 102 and 70% resin mixture 104. The aerogel hybrid 100 may include 2.5 or 2.6 grams of aerogel 102. In another aspect, the aerogel hybrid 100 may include 35% aerogel 102 and 65% resin mixture 104. The aerogel hybrid 100 may include 3.2 grams of aerogel 102. In still another aspect, the aerogel hybrid 100 may include 40% aerogel 102 and 60% resin mixture 104. The aerogel hybrid 100 may include 4 grams of aerogel 102. In yet another aspect, the aerogel hybrid 100 may include 45% aerogel 102 and 55% resin mixture 104. The aerogel hybrid 100 may contain 4.9 or 5 grams of aerogel 102. The percentage of aerogel 102 may be determined after the aerogel hybrid 100 is blended, at least according to one method. The percentage of aerogel 102 may be determined after the aerogel hybrid 100 is cured.

Aging the Aerogel Hybrid

The aerogel hybrid 100 may be aged (Step 216), as shown in FIG. 8. For example, the aerogel hybrid 100 may be aged after blending (Step 212). Alternatively, the aerogel 102 may be aged prior to mixing the aerogel 102 with the resin mixture 104. The aerogel hybrid 100 may not need to undergo aging according to at least one method. The aerogel hybrid 100 may still contain unreacted alkoxides when it reaches gel point. The gel obtained may be aged in a solvent for a longer time, allowing the gel to further solidify and form a porous stronger structure. New monomers may be added to the silicon and oxygen network in the aging process to increase cross-linking. After the aging process, the aerogel hybrid 100 may be washed by ethanol and heptane or other chemicals to remove remaining water in pores. The aging process prevents crack formation in the aerogel hybrid 100.

Curing the Aerogel Hybrid

After blending, the hybrid 100 may be cured (step 220), as shown in FIGS. 7 and 8. A draw-down bar 120 with a specified clearance (e.g., 4 mil) may be used to deposit the aerogel hybrid 100 (Step 218) as shown in FIG. 8. The specified clearance may be 4 mil, or the specified clearance may be smaller or larger than 4 mil. The aerogel hybrid 100 may also be deposited by other means, such as by a sprayer, roller, splattering, or other suitable methods known for depositing the aerogel hybrid 100 prior to curing. The depositing method may be determined by the type of surface the aerogel hybrid 100 is being applied to. Different additives may be added to the resin, aerogel or the aerogel hybrid 100 based on the depositing method. For example, a diluent additive may be added to decrease the viscosity of the aerogel hybrid 100 if the aerogel hybrid 100 is being sprayed. High pressure sprayers (e.g. airless), piezoelectric, sputtering can also be used. After placement of the aerogel hybrid 100, the aerogel hybrid 100 may be cured using by photopolymerization, such as with ultraviolet (UV) light, blue light, or visible light. The aerogel hybrid 100 can be cured using 105 mW/cm intensity with a 400-watt EC supply, according to one method of curing. The curing may be applied until the aerogel hybrid 100 is solidified. If the aerogel hybrid 100 has multiple layers, as shown in FIG. 6, the first layer 122 may be cured prior to a second layer 124 of the aerogel hybrid 100 being deposited on top of the first layer 122, (Step 222), as shown in FIG. 8. In one instance, the second layer 124 was cured until the coating solidified. The curing of the first layer 122 may be a shorter duration resulting in a semi solidified first layer 122. In one aspect, the second layer 124 of the aerogel hybrid 100 is applied and the first layer 122 and second layer 124 are cured until both layers have solidified together. The second layer 124 may be cured after being deposited on top of the first layer 122. Additional layers may be added on top of the second layer 124. The thickness of each layer of the aerogel hybrid 100 may be the same or may vary.

The aerogel hybrid 100 may be applied by dip coating or immersion coating. The surface substrate 106 may be partially or completely dipped into a bath filled with the aerogel hybrid 100 to effectively coat the entire surface or the part of the surface placed in the bath. The aerogel hybrid 100 may then be cured to the surface substrate. The aerogel hybrid 100 may be applied using electrophoretic deposition where the aerogel hybrid 100 is deposited on the surface of the substrate 106 where the substrate 106 acts as an electrode. If a very thin layer of aerogel hybrid 100 is required the aerogel hybrid 100 may be applied using a spin coating or centrifuge coating method. The substrate 106 is immersed in the aerogel hybrid 100. A centrifugal force may be used to remove the excess aerogel hybrid 100 leaving only a thin layer of the aerogel hybrid 100 on the surface of the substrate.

The aerogel hybrid 100 may also be deposited using trickle impregnation where surface tension effects allow the aerogel hybrid 100 to be wicked or soaked, up by the internal porosity of the substrate 106 the aerogel hybrid 100 is deposited on. This may involve preheating the substrate, dispensing the aerogel hybrid 100 onto the surface of the substrate 106 and after a certain amount of time, curing the aerogel hybrid 100. The aerogel hybrid 100 may also be deposited using vacuum-pressure impregnation where a vacuum or other means of creating pressure drive the aerogel hybrid 100 into the surface of the substrate 106 after a dip or trickle coating application. A part of the substrate 106 may be deposited, dipped, or submerged into a bath filled with the aerogel hybrid 100 under a vacuum. The vacuum is released or turned on to force the resin into or up the surface of the substrate. After the substrate 106 is removed from the bath, the substrate 106 may be drained, cleaned, and cured.

The aerogel hybrid 100 may also be applied to the substrate 106 by spraying or splattering the aerogel hybrid 100 onto the surface of the substrate. In at least one spraying method the resin 104 liquid is held in a hopper. The aerogel powder is held in a separate hopper. During the application of the aerogel hybrid 100 to the substrate 106 the resin 104 liquid passes under pressure through a flow path to a spray nozzle. Aerogel powder is metered into the flow path prior to the spray nozzle and combined or blended with the resin liquid. The resin 104 and aerogel 102 are discharged together from the spray nozzle onto a substrate. In at least one other spraying method, a combined mixture of the resin liquid and aerogel powder is held in a hopper and mixed or blended or the aerogel hybrid 100 is held in the hopper. The aerogel hybrid 100 is passed under pressure through a flow path to a nozzle for discharging onto a substrate. Another spraying method may include holding the resin liquid in a first hopper and the aerogel powder in a second hopper. The resin liquid is passed under pressure through a flow play to a resin spray nozzle. The aerogel powder is metered through a separate flow path to an aerogel spray nozzle. The resin nozzle and aerogel nozzle are converging nozzles and the aerogel powder and resin liquid are discharged simultaneously onto the substrate. The aerogel hybrid 100 may be formed on the substrate or immediately or shortly after the resin liquid and aerogel 102 are discharged.

The aerogel hybrid 100 may also be applied using a roller, such as a foam roller, or a brush, such as a paint brush. The surface of the substrate 106 may be roughed up, etched, or sanded to promote adhesion of the aerogel hybrid 100 to the surface of the substrate. A first layer of the aerogel hybrid 100 is applied to the surface of the substrate 106 using the roller or the brush. The first layer may be thin, even, and uniform. The first layer may serve as a base coat and could have a slightly rippled surface. Some substrates 106 are more absorbent than others and thicker layers of the aerogel hybrid 100 may be needed or the curing times may be longer. Bubbles may form at the surface. Once the first layer has had a chance to cure, additional aerogel hybrid 100 may be deposited to fill cracks, gouges, or nicks in the surface of the substrate. Sanding the substrate 106 can remove the light surface layer if the layer is uneven. Additional layers of the aerogel hybrid 100 may be applied. The aerogel hybrid 100 may also be heat cured or thermally cured to the substrate. The curing may occur when high temperature resins, chemicals, rods, or other fluids are used to harden the aerogel hybrid 100 by facilitating the cross-linking of polymer chains. Heat curing or thermal curing may require the addition of a thermally activated catalyst within the resin 104 or the aerogel hybrid 100. The catalyst induces cross-linking within the resin 104 once activated by heat. The thermally activated catalyst may be dibenzoyl peroxide or an amine compound, or other suitable component(s). The aerogel hybrid 100 may also be cured at room temperature. The aerogel hybrid 100 may also be chemically cured such as by the addition of a cross-linker or a hardener to facilitate cross-links between the polymer chains of the resin. The chemical additive may evaporate away after the aerogel hybrid 100 has cured or may evaporate away during the curing process. The aerogel hybrid 100 may also be dried using evaporation or moisture methods as well.

Scanning electron microscopy may be used to see the bonding between at least two layers of the aerogel hybrid 100 and determine whether the aerogel 102 is evenly distributed. Scanning electron microscopy may also be used to determine if the CPVC was reached. Other methods may be used to determine the adequacy of the bonding between the layers of the aerogel hybrid 100, to determine whether the aerogel 102 is evenly distributed and whether the CPVC was reached.

The aerogel hybrid 100 was deposited on glass (Step 218), in at least one instance, as shown in FIG. 8. The glass may be cleaned prior to use. Acetone or another chemical may be used to clean the glass. Other suitable may be used to deposit the aerogel hybrid 100 onto or between substrates, including wood, metal, glass, or plastics. Adhesion promoting additives may be added to the resin 104 or the aerogel hybrid 100 to promote adhesion to a specific type of substrate. The aerogel hybrid 100 may be deposited on the glass using the pull-down bar 120. Other methods may be used to deposit the aerogel hybrid 100 on the glass. The aerogel hybrid 100 may be cured prior to depositing the aerogel hybrid 100 on the glass or before depositing the aerogel hybrid 100 on the glass. Once deposited on the substrate 106 the aerogel hybrid 100 may be tested for transparency. The aerogel hybrid 100 may also be tested for transparency prior to being deposited on a substrate 106. The aerogel hybrid 100 may be tested for transparency by placing the aerogel hybrid 100 in front of an image. Other suitable methods for determining transparency may be used, such as using a spectrometer, transparency meter, optical sensors, radiofrequency. The last layer of the aerogel hybrid 100 may not be cured until a second substrate 106 is deposited on top of the aerogel hybrid 100, sandwiching the aerogel hybrid 100 between two substrates. For example, the aerogel may be between two panes of glass, a first pane of glass may be adjacent to the bottom of the aerogel hybrid 100 and a second pane of glass may be adjacent to the top of the aerogel hybrid 100. The aerogel hybrid 100 may also be placed into a container and then cured. For example, the aerogel hybrid 100 may be used in packaging, surrounded by a packaging component such as wood or metal. The aerogel hybrid 100 may also be used to insulate piping where the aerogel hybrid 100 is cured around the piping. Another substrate 106 may be placed over the aerogel hybrid 100 and the piping.

Thermal Properties of the Aerogel Hybrid

Figure 5:
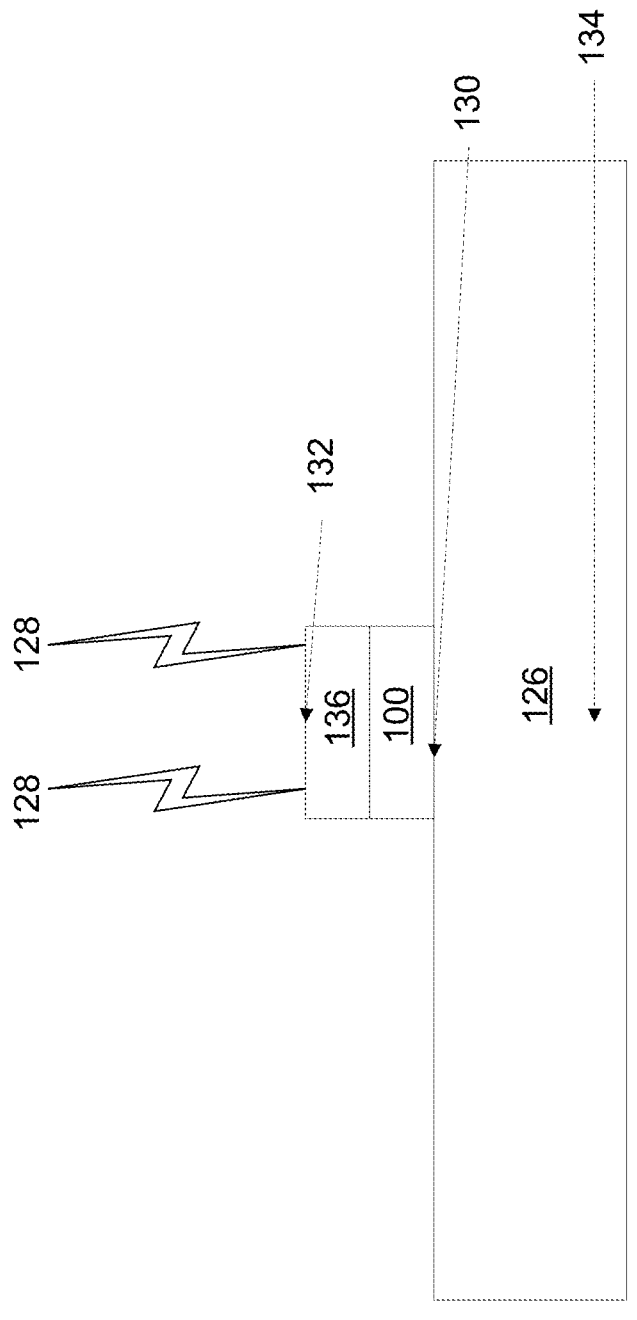
FIG. 5 is a pictorial representation illustrating measuring thermal properties of the aerogel hybrid.

The thermal properties of the aerogel hybrid 100 may be determined (step 224), for example, as shown in FIG. 8. The thermal properties of the aerogel hybrid 100 may be determined after the aerogel hybrid 100 is deposited on the substrate 106. The thermal conductance may also be measured using a laser heating and infrared camera-detecting (LHICD) method. Other suitable methods may be used to determine thermal conductance, such as differential scanning calorimetry, guarded hot plate method, axial flow method, guarded or unguarded heat flow meter method. In one aspect, the aerogel hybrid 100 is attached to a bulk aluminum 126. The aerogel hybrid 100 may be deposited on the substrate 106 prior to determining the thermal conductance. The attachment to the bulk aluminum 126, as shown in FIG. 5, may occur using thermal grease. A continuous laser 128 may be used to heat the surface of the aerogel hybrid 100. The temperature may be detected by an infrared camera. The sample may include only the aerogel hybrid 100. The sample may also include the aerogel hybrid 100 and the substrate 106 the aerogel hybrid 100 is deposited on. The thermal resistance of the sample (Rs) may be derived from the following equation:

$$R_s=D/AK_s=\Delta T/Q=(T2-T1)/Q$$

Q=laser energy absorbed by the upper surface or heat flow access the sample;

A=surface area of the sample;

D=thickness of the sample;

Ks=thermal conductivity of the aerogel hybrid;

T1=the temperature 130 at the bottom of the sample;

T2=the temperature 132 at the top of the sample or at the top of the fused quartz 136.

If Q and T1 130 cannot be directly measured, the thermal resistance from the interference with the aluminum bulk 126 may be calculate. The total thermal resistance may be serial expressed as:

$$R_s+R_{sub}=\Delta T/Q=(T2-T0)/Q, \text{ where}$$

$R_{sub}=\Delta T/Q=2Lc/(Qss*K_{a1}A_s)$;

$Lc=(A_s/4\pi)^{1/2}$;

$R_{sub}$=thermal resistance from the interference to the bulk Aluminum;

As=twice the interference area;

$K_{a1}$=thermal conductivity of the aluminum

Qss*=conduction heat rate, this may be taken to be 0.932 for the square surface area;

T0=temperature 134 of the bulk Aluminum 126, this may be equal to the environmental temperature.

In some aspects of the present disclosure, Q is not measured directly. The aerogel hybrid 100 sample may be placed between fused quartz and the bulk aluminum, as shown in FIG. 5. The surface of the aerogel hybrid 100 sample is heated using laser energy. The total thermal resistance can be expressed as:

$$(R_f+R_{sub})/(R_f+R_s+R_{sub})=(\Delta T/Q)_f/(\Delta T/Q)_f+S$$

$R_f$ and $R_{sub}$ can be calculated with $K_f$ and $K_{A1}$. $K_f$ and $K_{A1}$ may be known parameters. $K_f$ may be 1.38 and $K_{A1}$ may be 167 W/mK. $R_s$ is determined by calculated $\Delta T$. In some aspects of the present disclosure $R_{sub}$ may be ignored due to the high thermal conductivity of the Aluminum bulk 126. In one aspect of the present disclosure the thermal conductance is measured when the substrate 106 is glass and only the glass is placed between the fused quartz 136 and the aluminum bulk 126, the thermal resistance was 0.0026 Km2/W. In some aspects of the present disclosure the aerogel hybrid 100 has a greater thermal resistance and lower thermal conductance when comprised of a larger percentage of aerogel particles 102. In some aspects of the present disclosure the aerogel hybrid 100 has greater thermal resistance and lower thermal conductance when the aerogel hybrid 100 has a greater thickness.

Once R or thermal resistance is determined, the thermal conductivity (K) of the aerogel hybrid 100 may be determined. To find the K value, the formula below was used:

$1/R=K/\Delta x$

Here, K=Thermal conductivity $\Delta x$=Thickness of sample

R=Thermal resistance

Substrate $1061/R=K/\Delta x$ $K=\Delta x/R$

In at least one aspect, the thermal conductance is measured when the substrate 106 is glass and only the glass is placed between the fused quartz 136 and the aluminum bulk 126. In this instance the thermal conductivity is 0.85 W/mK. When the formulation includes a larger percentage of aerogel particles 102, the aerogel hybrid 100 may have a greater thermal conductivity.

The features, steps, formulations and components of the illustrative aspects of the present disclosure may be combined in any number of ways and are not limited specifically to those described. In particular, the illustrative embodiments contemplate numerous variations in the aerogel hybrid and methods for producing the aerogel hybrid described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of components, formulations, processes or methods of the disclosure. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of constructs for implementing the disclosure and is not intended to be limiting in scope. The following claims set forth a number of the constructs of the disclosure disclosed with greater particularity.

What is claimed is:

1. An aerogel hybrid formulation, comprising:
   a plurality of granular aerogel particles the size of 2-40 μm having interstitial spaces; and
   a resin mixture having at least two or more components including a reactive diluent;
   wherein the resin mixture wets the plurality of granular aerogel particles packed together to minimize interstitial spaces between the plurality of granular aerogel particles when within the resin mixture; and
   wherein the resin mixture fills the minimized interstitial spaces between the plurality of granular aerogel particles, enhancing the physical properties of the plurality of granular aerogel particles, forming the aerogel hybrid formulation.

2. The aerogel hybrid formulation of claim 1, wherein one of the at least two or more components comprises a free-radical photo initiator.

3. The aerogel hybrid formulation of claim 2, wherein at least another one of the at least two or more components comprises a polyacrylate.

4. The aerogel hybrid formulation of claim 1, wherein the resin mixture comprises a UV-curable resin.

5. The aerogel hybrid formulation of claim 1, wherein one of the at least two or more components of the resin mixture is a second reactive diluent comprising HDDA or TMPTA.

6. The aerogel hybrid formulation of claim 1, wherein each of the plurality of granular aerogel particles formed from, at least one product, selected from products comprising metal/metal oxides, carbon, metal chalcogenide, and organic polymers.

7. The aerogel hybrid formulation of claim 1, wherein the plurality of granular aerogel particles, each have a physical property of reduced heat transfer, and wherein the resin mixture enhances the reduced heat transfer physical property of each of the plurality of granular aerogel particles.

8. The aerogel hybrid formulation of claim 1, wherein the plurality of granular aerogel particles has a homogeneous distribution in the resin mixture.

9. The aerogel hybrid formulation of claim 1, wherein the resin mixture through a chemical reaction binds with the plurality of granular aerogel particles forming the aerogel hybrid formulation.

10. An aerogel hybrid formulation, comprising:
   a plurality of granular aerogel particles having interstitial spaces; and
   a resin mixture having at least two or more components including a reactive diluent;
   wherein the resin mixture wets the plurality of granular aerogel particles packed together to minimize interstitial spaces between the plurality of granular aerogel particles when within the resin mixture;
   wherein the resin mixture fills the minimized interstitial spaces between the plurality of granular aerogel particles, and the resin mixture through a chemical reaction binds with the plurality of granular aerogel particles enhancing the physical properties of the plurality of granular aerogel particles, forming the aerogel hybrid formulation.

11. The aerogel hybrid formulation of claim 10, wherein the plurality of granular aerogel particles comprise at least one size 2-40 $\mu$m, 100-700 $\mu$m and 100-1200 $\mu$m of silica aerogel particles.

12. The aerogel hybrid formulation of claim 11, wherein the silica aerogel particles form from, at least one chemical from a group of chemicals comprising silicon alkoxides, tetraethoxysilane Si(OC2H5)4, tetramethoxysilane Si(OCH3)4, and polyethoxydisiloxane SiOn (OC2H5)4-2n.

13. The aerogel hybrid formulation of claim 10, wherein the plurality of granular aerogel particles comprise granular aerogel particles of the size of 2-40 $\mu$m, the plurality of granular aerogel particles are packed together to minimize interstitial spaces between the plurality of granular aerogel particles within the resin mixture.

* * * * *